May 13, 1952     E. C. CONVERSE     2,596,655
HOUSE TRAILER DOLLY
Filed Feb. 9, 1949     2 SHEETS—SHEET 2
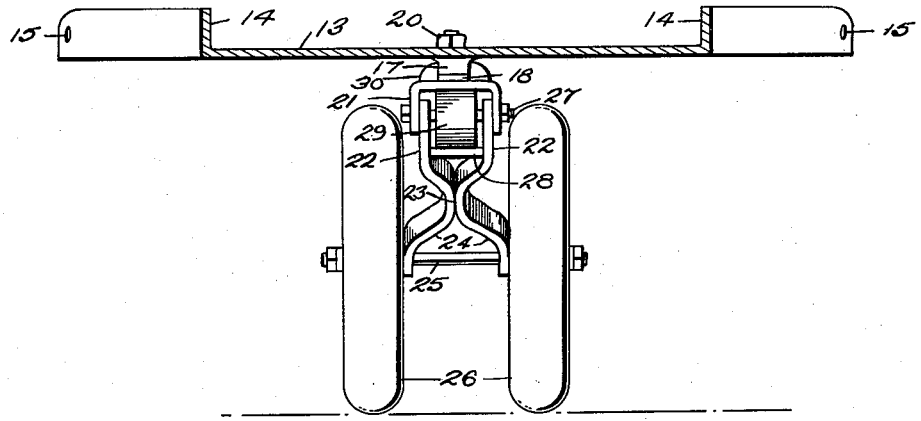
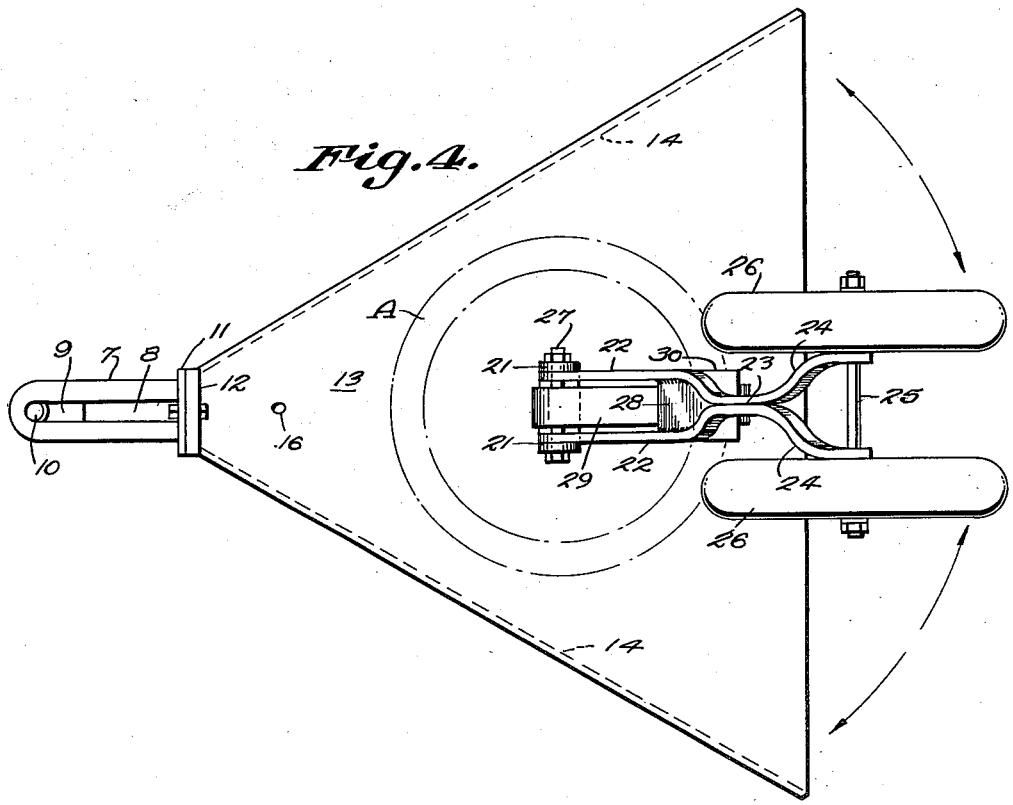
E. C. Converse
INVENTOR
BY *CA Snowles*
ATTORNEYS.

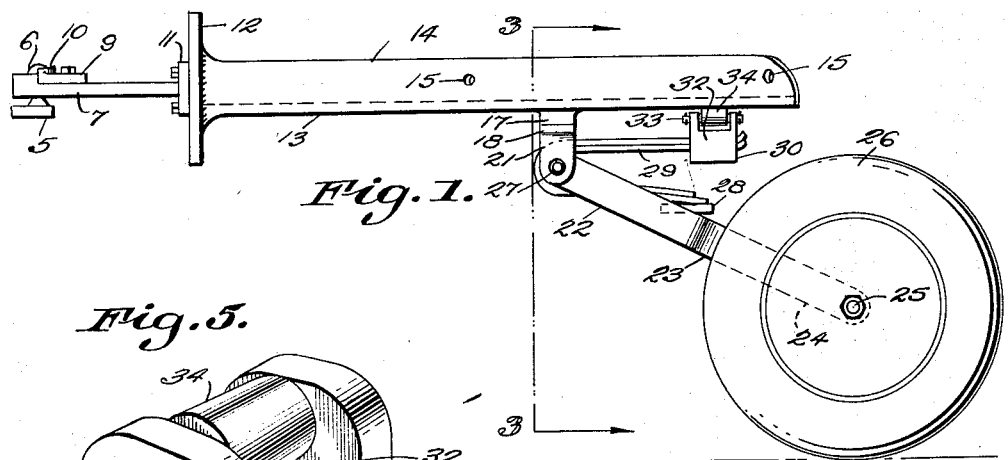
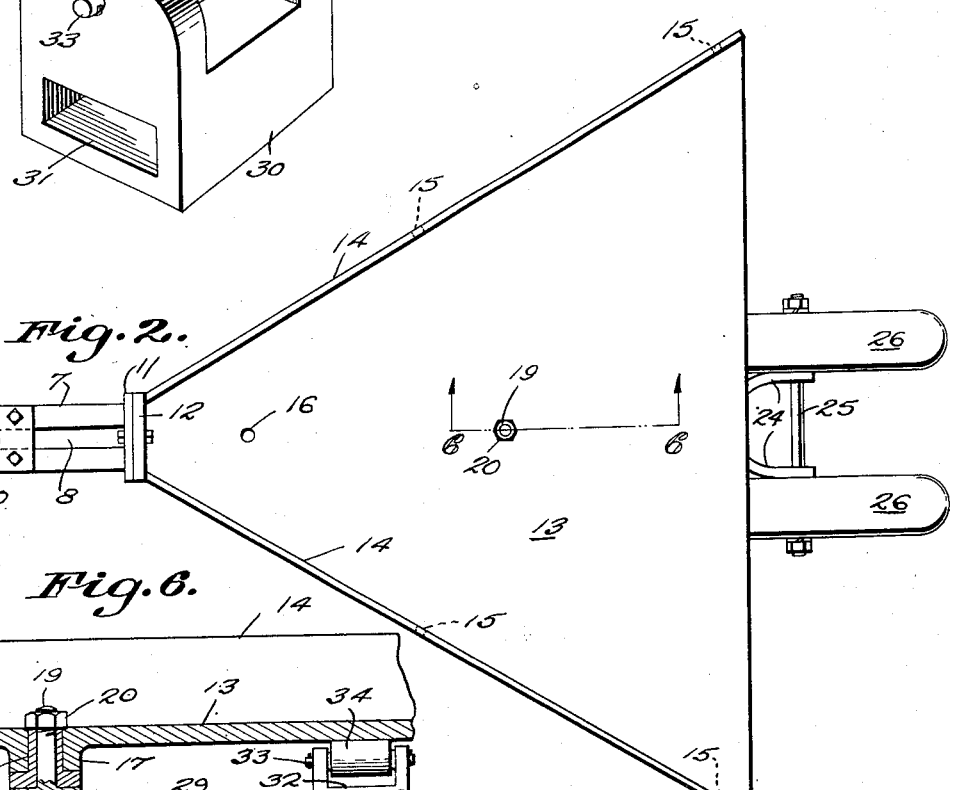
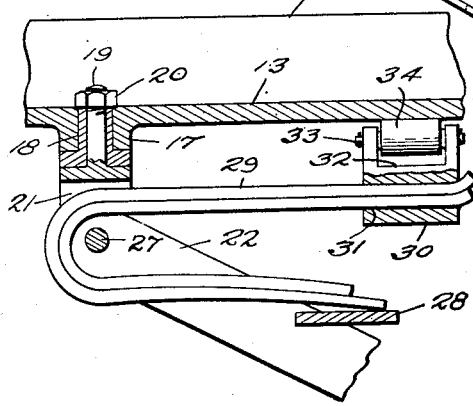
E. C. Converse
INVENTOR

Patented May 13, 1952

2,596,655

UNITED STATES PATENT OFFICE 2,596,655

HOUSE TRAILER DOLLY

Edwin C. Converse, Rialto, Calif.

Application February 9, 1949, Serial No. 75,407

1 Claim. (Cl. 280—79)

This invention relates to a house trailer dollie.

An important object of the invention is to provide a dollie which will be swively mounted below the front end of a trailer to facilitate movement around sharp curves.

Another important object is to provide a house trailer dollie which will be swively mounted as stated, and which will have a novel spring arrangement that will efficiently absorb shocks and will yet be of inexpensive construction.

Another important object is to provide a dollie which will be capable of manufacture at low cost, and which will yet be durable, having few parts with said parts being so arranged as not to readily get out of order.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings,

Figure 1 is a side elevational view of a dollie constructed in accordance with the invention.

Figure 2 is a top plan view.

Figure 3 is a section on line 3—3 of Figure 1.

Figure 4 is a bottom plan view.

Figure 5 is a perspective view of a roller block.

Figure 6 is an enlarged fragmentary longitudinal section showing the details of the mounting of a truck comprising a wheel supporting means to the dollie platform.

Referring to the drawings in detail, 5 is a draw bar extending from the rear of a traction vehicle (not shown), said draw bar having rigid therewith the upwardly extended ball 6.

The dollie of the invention has at its front end the horizontally and forwardly extended draw bar 7 having the longitudinal slot 8, the front end of the slot being rounded off spherically at 10 to conform to the shape of the ball 6. Removably bolted to the draw bar 7 is the lock plate 9 having its front end spherically recessed, also for ball engagement. These parts thus comprise a means for swively connecting the dollie at its front end to a traction vehicle.

Rigid with the rear end of the draw bar 7 is the vertically disposed connector plate 11, capable of being bolted in adjusted positions to the front plate 12 rigid with triangular platform 13 that is integrally formed with the upstanding side flanges 14. Side flanges 14 have the bolt holes 15, and formed in the platform 13 is the opening 16. These are for rigidly connecting to the platform the front end of a house trailer, not shown, so that said front end of the trailer will be supported upon the dollie.

Formed at a central location on the underside of the platform 13 is the downwardly extended apertured boss 17 (Figure 6) extended through which is the bronze bushing 18 in which is rotatable the stud 19 secured against withdrawal by nut 20. Stud 19 is integral with and extends upwardly from the yoke 21 connected to the platform for rotation in a horizontal plane and having a pair of depending arms embracing the front ends of spaced apart fork arms 22. Fork arms 22 extend downwardly and rearwardly at an angle from the yoke 21, said fork arms 22 converging at 23 and being welded together or otherwise fixedly connected. Rearward of their fixed connection 23, the fork arms have rearwardly diverging rear ends 24 in which is mounted an axle 25 that supports a pair of wheels 26.

The front ends of the fork arms 22 are pivotally connected to the depending yoke 21 by means of a pin 27.

Intermediate the ends of the fork arms, there is rigidly mounted between said arms a horizontally disposed spring bearing plate 28, supporting one end of a U-shaped laminated spring 29. Spring 29 has its intermediate portion extended around the pivot pin 27, and the other end of the spring is mounted within a roller block 30 having the bore 31 for receiving said other end of the spring. The intermediate portion of the spring is disposed between the upper ends of the fork arms 22, and said upper ends are spaced closely from opposite sides of the spring so as to constitute a keeper that will confine the spring and hold it to a desirable minimum of lateral deviation.

The upper end of the block 30 is recessed downwardly as at 32, so as to provide a space across which extends the pin 33, for rotatable mounting on the block of a roller 34.

Block 34 has rolling engagement with the flat underside of the platform 13, being held against said underside by the tendency of the spring 29 to expand. Spring 29 at the same time presses the wheels downwardly against the supporting surface on which the dollie is drawn.

From the above, it may be observed that the members 22, 24 and wheel 26 comprise a truck or wheeled carriage in which the wheels are carried at the rear end of the truck, while at the front end, the truck is connected to the dollie platform universally, that is, it pivots on its connection in a vertical plane, and also swings on said connection in a horizontal plane. At the same time, spring 29, and roller means 30, 34 comprise a shock absorbing means one end of which has rolling engagement with the platform 13, moving in a circular path A (Figure 4), with the other end of said shock absorbing means being mounted directly upon the truck.

In use, as the house trailer is drawn by the traction vehicle, curves will be taken by the truck swivelling in the direction of the arrows in Figure 4, with the roller traversing said circular path A. The shock absorbing means, in the meantime, is functioning fully independently of the connection of the truck to the platform, with said shock absorbing means, though compressed directly between the platform and the truck, being fully spaced from and operating with complete independence of the swivelled yoke 21 and the pivotal connection 27 of the wheel supports to said yoke.

What is claimed is:

In a house trailer dollie a platform having a flat underside; a yoke depending from the platform and connected thereto for rotation in a horizontal plane, said yoke having a pair of downwardly extended arms; a pair of inclined, rigidly connected fork arms having their upper ends embraced by the yoke arms and pivotally connected thereto to swing in a vertical plane; a ground wheel rotatably mounted on the lower ends of the fork arms; a bearing plate rigid with and extended between the medial portions of the fork arms; a U-shaped leaf spring supported at one end on the plate, the intermediate portion of the spring being disposed between the upper ends of the fork arms, the respective fork arms being spaced closely from opposite sides of the spring and forming a keeper confining the spring against substantial lateral deviation; a block underlying the platform and in which the other end of the spring is mounted; and a roller carried by the block and rolling upon the underside of the platform through a circular path having as its center the axis of rotation of the yoke.

EDWIN C. CONVERSE.

REFERENCES CITED

The following references are of record in the file of this patent:

UNITED STATES PATENTS

| Number | Name | Date |
| --- | --- | --- |
| 510,249 | Faulkner | Dec. 5, 1893 |
| 2,033,298 | Pribil | Mar. 10, 1936 |
| 2,040,121 | Bowen | May 12, 1936 |
| 2,094,050 | Wachter | Sept. 28, 1937 |
| 2,134,351 | Arehart | Oct. 25, 1938 |
| 2,453,916 | Inskeep | Nov. 16, 1948 |
| 2,469,152 | Brown | May 3, 1949 |

FOREIGN PATENTS

| Number | Country | Date |
| --- | --- | --- |
| 478,527 | Great Britain | Jan. 20, 1938 |
| 521,130 | Great Britain | May 13, 1940 |